US011174757B2

(12) United States Patent
Cerino et al.

(10) Patent No.: US 11,174,757 B2
(45) Date of Patent: Nov. 16, 2021

(54) EXTERNALLY REPLACEABLE VALVE ASSEMBLY FOR A TURBINE ENGINE

(71) Applicant: United Technologies Corporation, Farmington, CT (US)

(72) Inventors: Joseph N. Cerino, Middletown, CT (US); Andrew Yanaros, West Hartford, CT (US); Paul W. Duesler, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/747,330

(22) Filed: Jan. 20, 2020

(65) Prior Publication Data

US 2021/0222587 A1   Jul. 22, 2021

(51) Int. Cl.
*F01D 25/24* (2006.01)
*F02C 9/18* (2006.01)
*F01D 17/10* (2006.01)
*F04D 27/02* (2006.01)
*F02C 6/08* (2006.01)
*F02C 9/52* (2006.01)

(52) U.S. Cl.
CPC .......... *F01D 25/24* (2013.01); *F01D 17/105* (2013.01); *F02C 6/08* (2013.01); *F02C 9/18* (2013.01); *F02C 9/52* (2013.01); *F04D 27/023* (2013.01); *F04D 27/0215* (2013.01)

(58) Field of Classification Search
CPC .......... F01D 25/24; F01D 17/105; F02C 9/18; F02C 9/52; F02C 6/08; F04D 27/0215; F04D 27/023

USPC ....................................................... 415/182.1
See application file for complete search history.

(56) References Cited

U.S. PATENT DOCUMENTS

| 3,023,763 A | 3/1962 | Lanctot |
| 3,513,899 A | 5/1970 | Paduch |
| 3,557,549 A | 1/1971 | Webster |
| 3,646,753 A | 3/1972 | Colman |
| 3,972,641 A | 8/1976 | Harner |
| 4,052,845 A | 10/1977 | Tumavicus |
| 4,671,318 A | 6/1987 | Benson |
| 4,715,779 A | 12/1987 | Suciu |
| 5,477,673 A * | 12/1995 | Blais ...................... F02K 3/075 60/785 |
| 6,122,905 A | 9/2000 | Liu |

(Continued)

OTHER PUBLICATIONS

EP search report for EP20209024.7 dated May 3, 2021.

*Primary Examiner* — Mahmoud Gimie
(74) *Attorney, Agent, or Firm* — Getz Balich LLC

(57) ABSTRACT

An assembly is provided for a turbine engine with an axial centerline. This assembly includes a turbine engine structure and a valve assembly. The turbine engine structure includes an outer duct wall, an inner duct wall, a first flow path and a second flow path. The inner duct wall is radially inward of the outer duct wall. The first flow path is radially inward of the inner duct wall. The second flow path is radially outward of the inner duct wall and is radially inward of the outer duct wall. The valve assembly includes a valve element and a valve actuator. The valve element is configured to regulate flow of fluid between the first flow path and the second flow path. The valve actuator is configured to move the valve element. The valve actuator is positioned entirely radially outward of the outer duct wall.

19 Claims, 15 Drawing Sheets

(56) References Cited

U.S. PATENT DOCUMENTS

| | | |
|---|---|---|
| 6,851,255 B2 | 2/2005 | Aitchison |
| 6,981,842 B2 | 1/2006 | D Angelo |
| 7,114,519 B2 | 10/2006 | Aitchison |
| 7,493,770 B2 | 2/2009 | Christianson |
| 7,555,905 B2 | 7/2009 | Borcea |
| 7,797,945 B2 | 9/2010 | Appleby |
| 8,128,347 B2 | 3/2012 | Sokhey |
| 8,196,934 B2 | 6/2012 | Do |
| 8,250,852 B2 | 8/2012 | Porte |
| 8,590,308 B2 | 11/2013 | Kirby |
| 8,814,498 B2 | 8/2014 | Goodman |
| 9,624,870 B2 | 4/2017 | Ress, Jr. |
| 10,273,884 B2 | 4/2019 | Ribarov |
| 2004/0016238 A1* | 1/2004 | Eleftheriou ......... F04D 27/0215 60/785 |
| 2005/0019156 A1 | 1/2005 | D Angelo |
| 2005/0116114 A1 | 6/2005 | Aitchison |
| 2007/0234738 A1 | 10/2007 | Borcea |
| 2009/0293498 A1* | 12/2009 | Petty ................ F02C 7/20 60/796 |
| 2010/0119356 A1 | 5/2010 | Fintescu |
| 2011/0265490 A1 | 11/2011 | Klasing |
| 2012/0128470 A1 | 5/2012 | Goodman |
| 2013/0183136 A1 | 7/2013 | Roberge |
| 2013/0199156 A1 | 8/2013 | Ress, Jr. |
| 2013/0259664 A1* | 10/2013 | Denis ................ B23K 31/02 415/182.1 |
| 2014/0311595 A1 | 10/2014 | Bagge |
| 2014/0360178 A1* | 12/2014 | Wang ................ F02D 41/0007 60/602 |
| 2015/0004011 A1 | 1/2015 | Army |
| 2016/0341130 A1 | 11/2016 | Marocchini |
| 2017/0356348 A1 | 12/2017 | Ribarov |
| 2019/0331030 A1 | 10/2019 | Kelly |

* cited by examiner

EXTERNALLY REPLACEABLE VALVE ASSEMBLY FOR A TURBINE ENGINE

This invention was made with Government support awarded by the United States. The Government has certain rights in this invention.

BACKGROUND OF THE DISCLOSURE

1. Technical Field

This disclosure relates generally to a turbine engine and, more particularly, to a valve assembly for a turbine engine.

2. Background Information

A gas turbine engine may include a valve assembly for selectively fluidly coupling one flow path with another flow path. A typical valve assembly is connected to a duct wall and is configured to open and close an aperture in that duct wall, where the aperture fluidly couples the flow paths when the valve assembly is open. Such a valve assembly, however, may be difficult to inspect and/or replace since the valve assembly and the duct wall are often buried deep within the engine structure. There is a need in the art therefore for at least some features of a valve assembly, requiring more frequent inspection and/or repair, which can be more readily inspected and replaced.

SUMMARY OF THE DISCLOSURE

According to an aspect of the present disclosure, an assembly is provided for a turbine engine with an axial centerline. This turbine engine assembly includes a turbine engine structure and a valve assembly. The turbine engine structure includes an outer duct wall, an inner duct wall, a first flow path and a second flow path. The inner duct wall is radially inward of the outer duct wall. The first flow path is radially inward of the inner duct wall. The second flow path is radially outward of the inner duct wall and is radially inward of the outer duct wall. The valve assembly includes a valve element and a valve actuator. The valve element is configured to regulate flow of fluid between the first flow path and the second flow path. The valve actuator is configured to move the valve element. The valve actuator may be positioned entirely radially outward of the outer duct wall.

According to another aspect of the present disclosure, an assembly is provided for a turbine engine with an axial centerline. This turbine engine assembly includes a turbine engine structure and a valve assembly. The turbine engine structure includes an outer duct wall, an inner duct wall, a first flow path and a second flow path. The inner duct wall is disposed inward of the outer duct wall. The first flow path is disposed inward of the inner duct wall. The second flow path is disposed outward of the inner duct wall and is disposed inward of the outer duct wall. The valve assembly is configured regulate flow of fluid through a passage in the inner duct wall between the first flow path and the second flow path. The valve assembly includes a spring loaded valve actuator disposed outward of the outer duct wall.

According to still another aspect of the present disclosure, an assembly is provided for a turbine engine with an axial centerline. This turbine engine assembly includes a turbine engine structure and a valve assembly. The turbine engine structure includes an outer duct wall, an inner duct wall, a first flow path and a second flow path. The inner duct wall is radially inward of the outer duct wall. The first flow path is radially inward of the inner duct wall. The second flow path is radially outward of the inner duct wall and is radially inward of the outer duct wall. The valve assembly includes a valve element and a valve actuator. The valve element is mechanically coupled to the inner duct wall and configured to regulate flow of fluid between the first flow path and the second flow path. The valve actuator is configured to move the valve element. The valve actuator is severable from the valve element and disposed outside of the turbine engine structure.

The valve actuator may include a piston.

The valve actuator may further include a spring element engaging the piston.

The valve actuator may include a spring element.

The valve actuator may be configured as or otherwise include an electric motor.

The valve actuator may be configured to translate the valve element between an open position and a closed position. The first flow path may be fluidly coupled with the second flow path through a passage in the inner duct wall. The valve element may be configured to open the passage when the valve element is in the open position. The valve element may be configured to close the passage when the valve element is in the closed position.

The valve element may be radially outward of the inner duct wall when the valve element is in the open position.

The valve element may be radially inward of the inner duct wall when the valve element is in the open position.

The valve element may be configured as or otherwise include a valve plunger. The valve actuator may be configured to translate the valve plunger along a longitudinal axis of the valve assembly between an open position and a closed position.

The valve assembly may further include a rod that extends within the second flow path and mechanically couples the valve actuator to the valve element.

The rod may be connected to the valve element through a pivot joint.

The valve assembly may also include a second rod that extends within the second flow path and mechanically couples the rod to the valve element. The rod may be connected to the second rod through a second pivot joint.

The pivot joint may be configured as or otherwise include a ball joint.

The pivot joint may be configured as or otherwise include a socket joint.

The rod may be connected to the valve element through a threaded joint.

The valve assembly may be configured for complete removal from the turbine engine structure without access to an interior of the outer duct wall.

The valve element may be mechanically coupled to the inner duct wall. The valve actuator may be severable from the valve element. The valve actuator may be configured for complete removal from the turbine engine structure without access to an interior of the outer duct wall.

The turbine engine structure may further include an intermediate structure radially between the inner duct wall and the outer duct wall. The second flow path may be radially inward of the intermediate structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
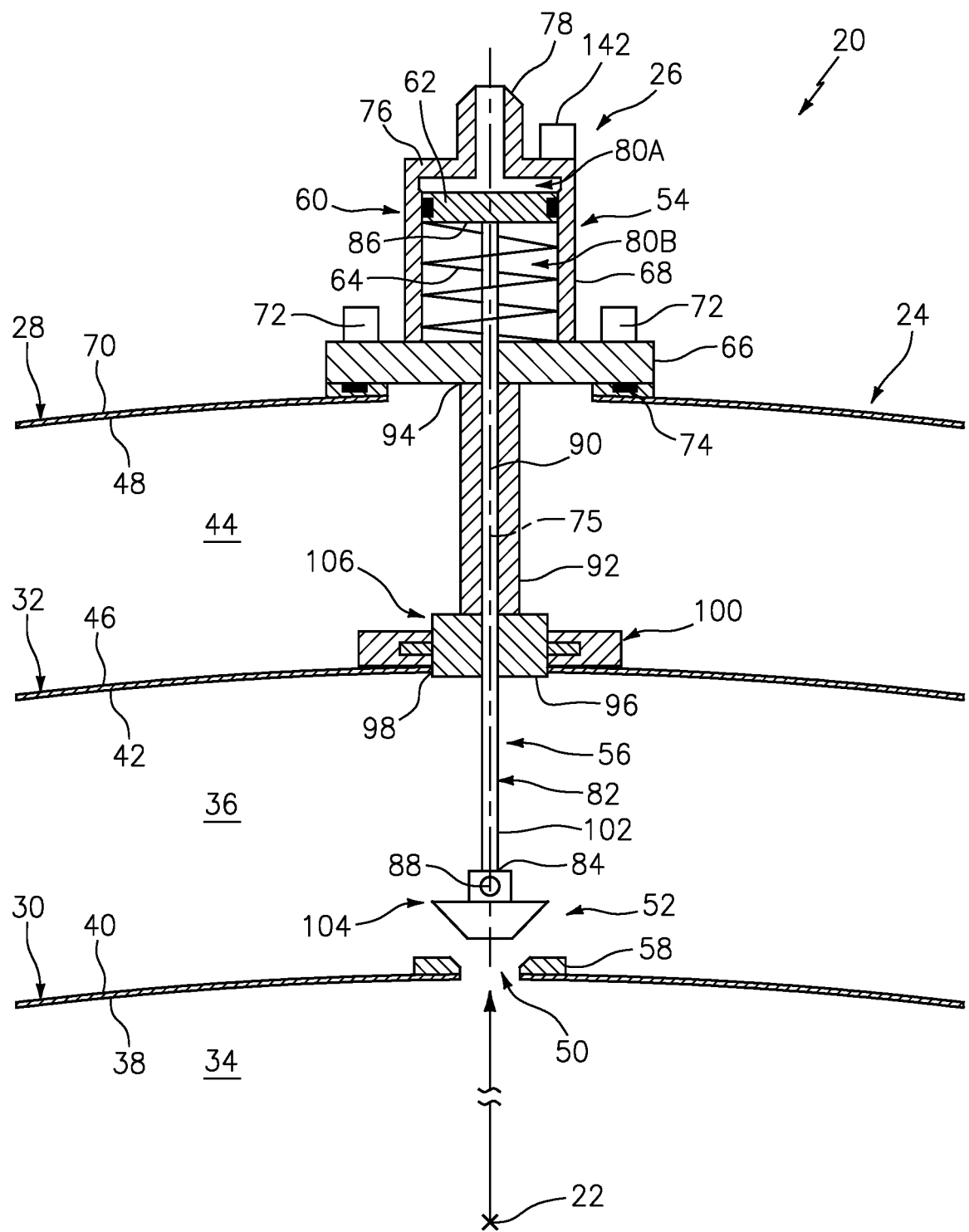
FIG. 1 is a cross-sectional sectional illustration of a portion of a turbine engine assembly with its valve element in an open position.
Figure 2:
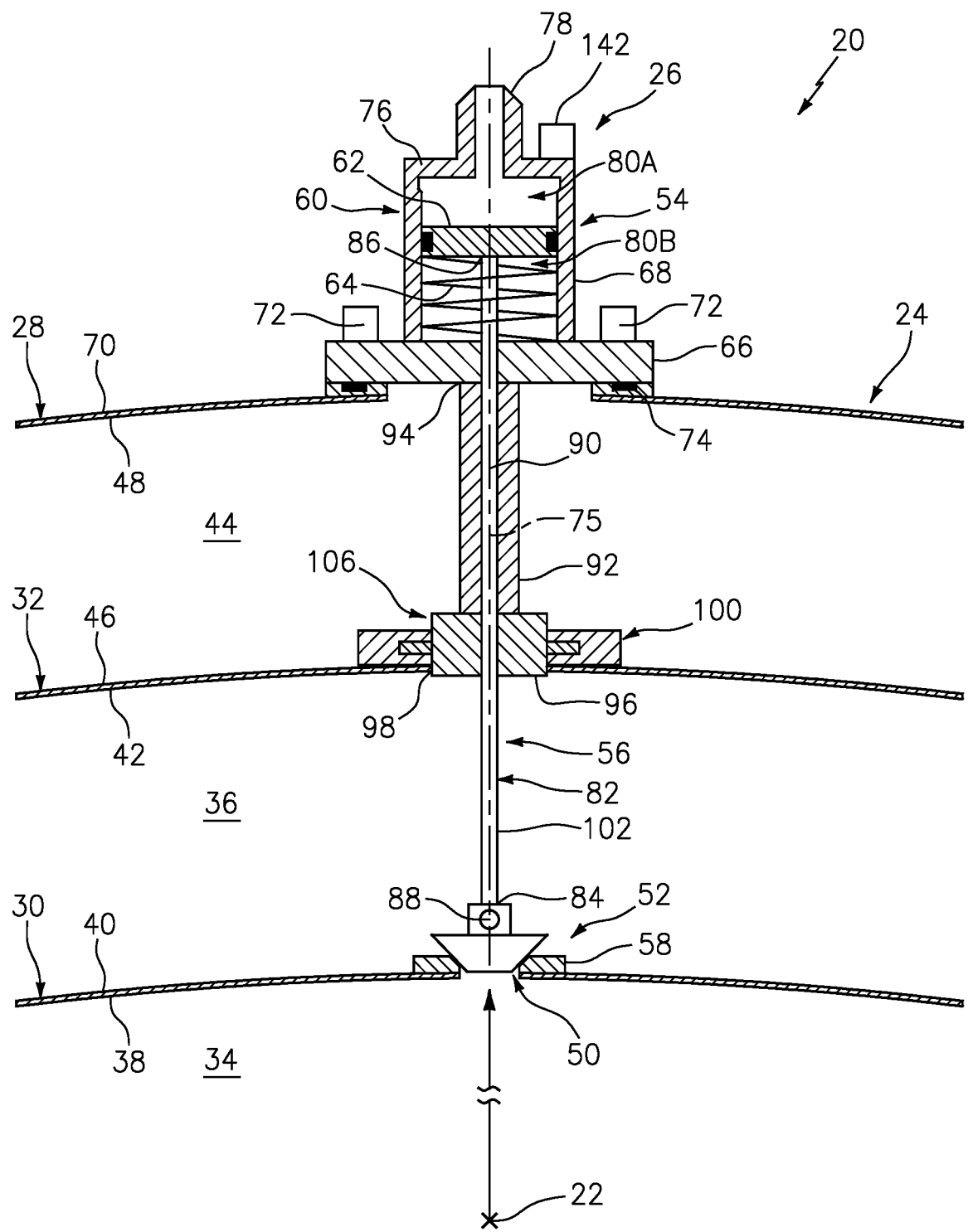
FIG. 2 is a cross-sectional sectional illustration of a portion of the turbine engine assembly of FIG. 1 with its valve element in a closed position.

FIGS. 1 and 2 illustrate an assembly 20 for a turbine engine with an axial centerline 22, which centerline 22 may be coaxial with an axis of rotation (e.g., a rotational axis) of the turbine engine and/or one or more of its rotating components. The turbine engine assembly 20 of FIGS. 1 and 2 includes a turbine engine structure 24 and a valve assembly 26.

The turbine engine structure 24 is configured as a stationary structure within the turbine engine. The turbine engine structure 24 includes an outer duct wall 28 and an inner duct wall 30. The turbine engine structure 24 of FIGS. 1 and 2 may also include an intermediate structure 32 such as, but not limited to, an intermediate (e.g., duct) wall or casing. The turbine engine structure 24 is further configured with a first (e.g., inner) flow path 34 and a second (e.g., outer) flow path 36.

Figure 3:
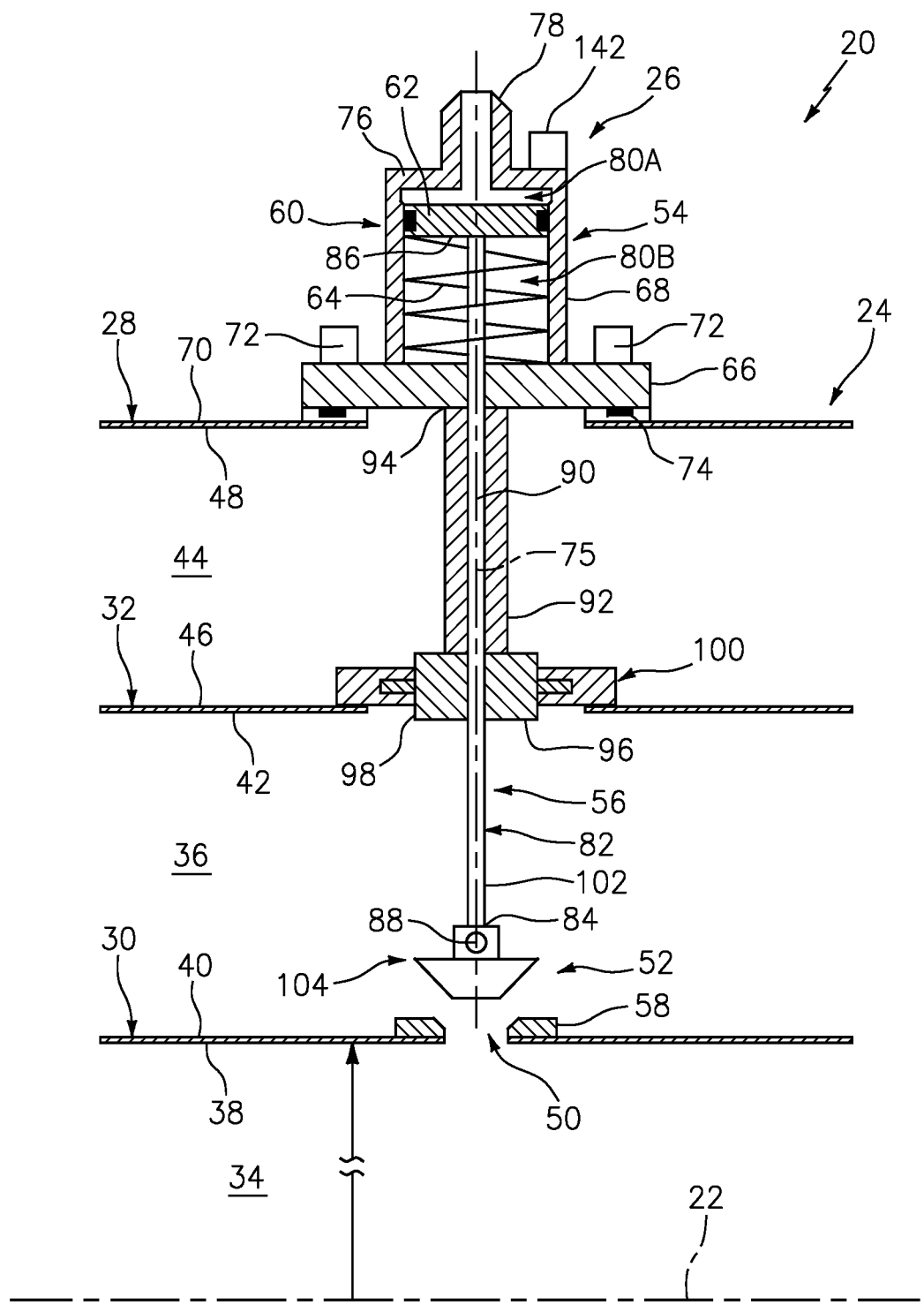
FIG. 3 is a side sectional illustration of a portion of the turbine engine assembly of FIG. 1 with its valve element in the open position.

The outer duct wall 28 may be an arcuate or tubular body. The outer duct wall 28, for example, extends axially along the axial centerline 22 (see also FIG. 3). The outer duct wall 28 extends circumferentially about (e.g., partially or completely around) the axial centerline 22.

The inner duct wall 30 may be an arcuate or tubular body. The inner duct wall 30, for example, extends axially along the axial centerline 22 (see also FIG. 3). The inner duct wall 30 extends circumferentially about (e.g., partially or completely around) the axial centerline 22. The inner duct wall 30 is arranged radially inward of (e.g., radially within) the outer duct wall 28. The outer duct wall 28 of FIGS. 1 and 2 thereby at least partially or completely circumscribes the inner duct wall 30.

The intermediate structure 32 may be an arcuate or tubular body. The intermediate structure 32, for example, extends axially along the axial centerline 22 (see also FIG. 3). The intermediate structure 32 extends circumferentially about (e.g., partially or completely around) the axial centerline 22. The intermediate structure 32 is arranged radially inward of (e.g., radially within) the outer duct wall 28 and radially outward of the inner duct wall 30. The outer duct wall 28 of FIGS. 1 and 2 thereby at least partially or completely circumscribes the intermediate structure 32. The intermediate structure 32 at least partially or completely circumscribes the inner duct wall 30.

The first flow path 34 is located radially inward of the inner duct wall 30. An outer periphery of the first flow path 34, for example, may be at least partially or completely formed by a radial inner surface 38 of the inner duct wall 30. This first flow path 34 may be a partially annular or a completely annular flow path.

The second flow path 36 is located radially outward of the inner duct wall 30 and radially inward of the outer duct wall 28. The second flow path 36 may also be radially inward of the intermediate structure 32. An inner periphery of the second flow path 36, for example, may be at least partially or completely formed by a radial outer surface 40 of the inner duct wall 30. An outer periphery of the second flow path 36 may be at least partially or completely formed by a radial inner surface 42 of the intermediate structure 32, or the outer duct wall 28 where the turbine engine structure 24 is configured without the intermediate structure 32 as discussed below in further detail. The second flow path 36 may be a partially annular or a completely annular flow path.

A void 44 (e.g., a cavity or a compartment) may be formed radially by and between the outer duct wall 28 and the intermediate structure 32. An inner periphery of the void 44, for example, may be at least partially or completely formed by a radial outer surface 46 of the intermediate structure 32. An outer periphery of the void 44 may be at least partially or completely formed by a radial inner surface 48 of the outer duct wall 28. The void 44 may be a partially annular or a completely annular void.

The valve assembly 26 of FIGS. 1 and 2 is configured to regulate flow of fluid (e.g., gas such as air) between the first flow path 34 and the second flow path 36. In particular, the valve assembly 26 is configured to selectively open (see FIG. 1) and close (see FIG. 2) a passage 50 formed by an aperture (e.g., a through-hole) in the inner duct wall 30, which passage 50 fluidly couples the first flow path 34 with the second flow path 36 when the passage 50 is open. The valve assembly 26 of FIGS. 1 and 2 includes a valve element 52, a valve actuator 54 and a valve linkage 56.

The valve element 52 is configured regulate the flow of fluid through the passage 50 and, more particularly, open (see FIG. 1) and close (see FIG. 2) the passage 50. The valve element 52 of FIGS. 1 and 2, for example, is configured as a valve plunger adapted to uncover the passage 50 when in an open position (see FIG. 1) and partially or completely cover/plug the passage 50 when in a closed position (see FIG. 2). In the specific embodiment of FIGS. 1 and 2, the valve element 52 is configured with a trapezoidal sectional geometry such that at least a portion of the valve element 52 may project into the passage 50 and be seated against an annular land 58 on the inner duct wall 30 when in the closed position (see FIG. 2). The present disclosure, however, is not limited to the foregoing exemplary valve element configuration.

The valve actuator 54 is configured to move, by way of/through the valve linkage 56, the valve element 52 between its open position (see FIG. 1) and its closed position (see FIG. 2). The valve actuator 54 may be configured as a spring loaded valve actuator. The valve actuator 54 of FIGS. 1 and 2, for example, includes an actuator housing 60, a piston 62 (e.g., hydraulic or pneumatic plunger) and a spring element 64 (e.g., a coil spring).

The actuator housing 60 includes a housing mount 66 (e.g., a base, a cover plate, etc.) and a housing wall 68. The housing mount 66 may be configured as a mounting plate. The housing mount 66 is positioned radially outward of the outer duct wall 28 and, thus, the entire turbine engine structure 24. The housing mount 66 of FIGS. 1 and 2, for example, is abutted against a radial outer surface 70 of the outer duct wall 28. The housing mount 66 may be removably mounted (e.g., mechanically attached) to the outer duct wall 28 by, for example, one or more fasteners 72; e.g., bolts. The present disclosure, however, is not limited to any particular mounting techniques. In the specific embodiment of FIGS. 1 and 2, an annular seal element 74 (e.g., a ring seal) is arranged between the housing mount 66 and the outer duct wall 28.

The housing wall 68 is arranged with the housing mount 66 to form an internal cavity (e.g., chamber) within the actuator housing 60. This internal cavity extends laterally (e.g., radially relative to a longitudinal axis 75 of the valve assembly 26) within the actuator housing 60 between opposing sides of the housing wall 68. The internal cavity extends longitudinally along the longitudinal axis 75 within the actuator housing 60 between the housing mount 66 and an end 76 of the housing wall 68. The housing wall 68 of FIGS. 1 and 2 is configured with a port 78 (e.g., an inlet/outlet orifice) fluidly coupled with the internal cavity. This port 78 provides a fluid coupling between the internal cavity and a fluid source such as, but not limited to, a pneumatic fluid source (e.g., a bleed port in a compressor of the turbine engine) or a hydraulic pump.

The piston 62 is arranged within the internal cavity. The piston 62 is configured to fluidly divide the internal cavity into two sub-cavities 80A and 80B. The first (e.g., radial outer) sub-cavity 80A extends longitudinally along the longitudinal axis 75 between the piston 62 and the end 76 of the housing wall 68. The first sub-cavity 80A is fluidly coupled with the port 78. The second (e.g., radial inner) sub-cavity 80B extends longitudinally along the longitudinal axis 75 between the piston 62 and the housing mount 66.

The spring element 64 is arranged within the second sub-cavity 80B. The spring element 64 extends longitudinally along the longitudinal axis 75 between and engages (e.g., is pressed against and/or contacts) the piston 62 and the housing mount 66. The spring element 64 is thereby operable to bias the piston 62 longitudinally along the longitudinal axis 75 away from the housing mount 66; e.g., in a radial outward direction relative to the centerline 22.

The valve linkage 56 is configured to mechanically couple the valve actuator 54 and, more particularly, the piston 62 with the valve element 52. The valve linkage 56 of FIGS. 1 and 2, for example, is configured as a rod 82; e.g., a push/pull rod. This rod 82 may be configured as a cylindrical body, or alternatively a tubular body. The valve linkage 56/the rod 82 extends longitudinally along the longitudinal axis 75 between opposing inner and outer linkage ends 84 and 86, which axis 75 may be perpendicular to and/or coincident with the axial centerline 22 of the turbine engine. The valve linkage 56 is connected (e.g., fixedly attached) to the piston 62 at (on, adjacent or proximate) the outer linkage end 86. The valve linkage 56 is connected to the valve element 52 at (on, adjacent or proximate) the inner linkage end 84. The valve linkage 56, for example, may be secured to the valve element 52 through a pivot joint 88 such as, but not limited to, a ball joint; e.g., a spherical joint. Of course, in other embodiments, the valve linkage 56 may alternatively be fixedly attached to the valve element 52.

In the embodiment of FIGS. 1 and 2, an intermediate portion 90 of the valve linkage 56 is supported by a linkage housing 92; e.g., a support sheath. More particularly, the valve linkage 56 projects longitudinally along the longitudinal axis 75 through an internal bore of the linkage housing 92. An outer end 94 of the linkage housing 92 is connected to the housing mount 66. An inner end 96 of the linkage housing 92 projects longitudinally into (or through) an aperture 98 in the intermediate structure 32. The inner end 96 of the linkage housing 92 is sealingly engaged with the intermediate structure 32. A slider seal joint 100 (e.g., a radial slider seal), for example, may seal an annular gap between the inner end 96 of the linkage housing 92 and the intermediate structure 32. With this arrangement, the linkage housing 92 may also shield the valve linkage 56 as its intermediate portion 90 extends within/through the void 44.

An inner portion 102 of the valve linkage 56 may project out from the linkage housing 92. This inner portion 102 extends longitudinally along the longitudinal axis 75 (e.g., radially relative to the axial centerline 22) within the second flow path 36 to the inner linkage end 84 and the valve element 52.

During valve assembly operation, an actuation fluid (e.g., pneumatic or hydraulic fluid) may be directed into the interior cavity and, more particularly, its first sub-cavity 80A to cause the piston 62 to move away from the end 76 of the housing wall 68 (e.g., radially inward). This movement of the piston 62 along the longitudinal axis 75 causes the valve linkage 56 to move (e.g., translate) the valve element 52 from its open position (see FIG. 1) to its closed position (see FIG. 2). By contrast, where the actuation fluid is not directed into the first sub-cavity 80A and/or the pressure of the actuation fluid within the first sub-cavity 80A is relatively low (e.g., below a spring force threshold), the spring element 64 may cause the piston 62 to move away from the housing mount 66 (e.g., radially outward). This movement of the piston 62 along the longitudinal axis 75 causes the valve linkage 56 to move (e.g., translate) the valve element 52 from its closed position (see FIG. 2) to its open position (see FIG. 1).

Figure 4:
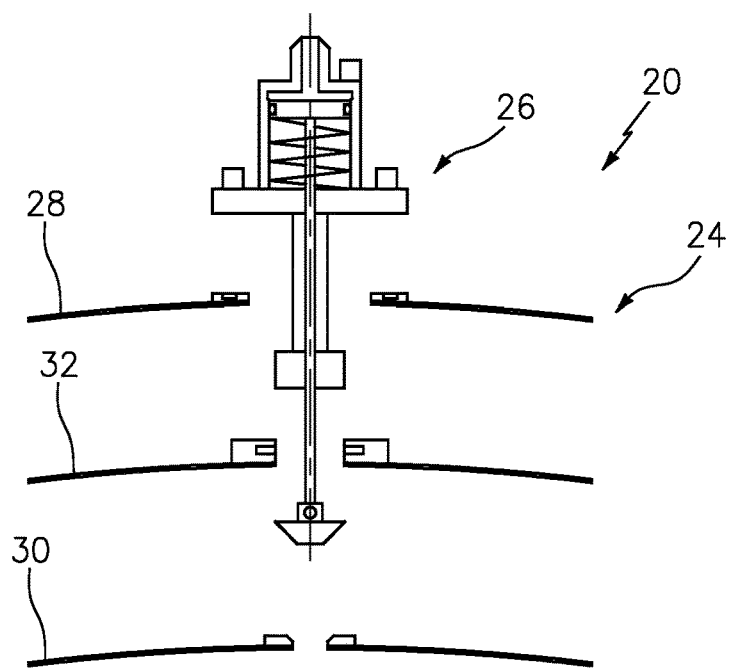
FIGS. 4 and 5 illustrate a sequence of steps during removal of a valve assembly from a turbine engine structure of the turbine engine assembly of FIG. 1.
Figure 5:
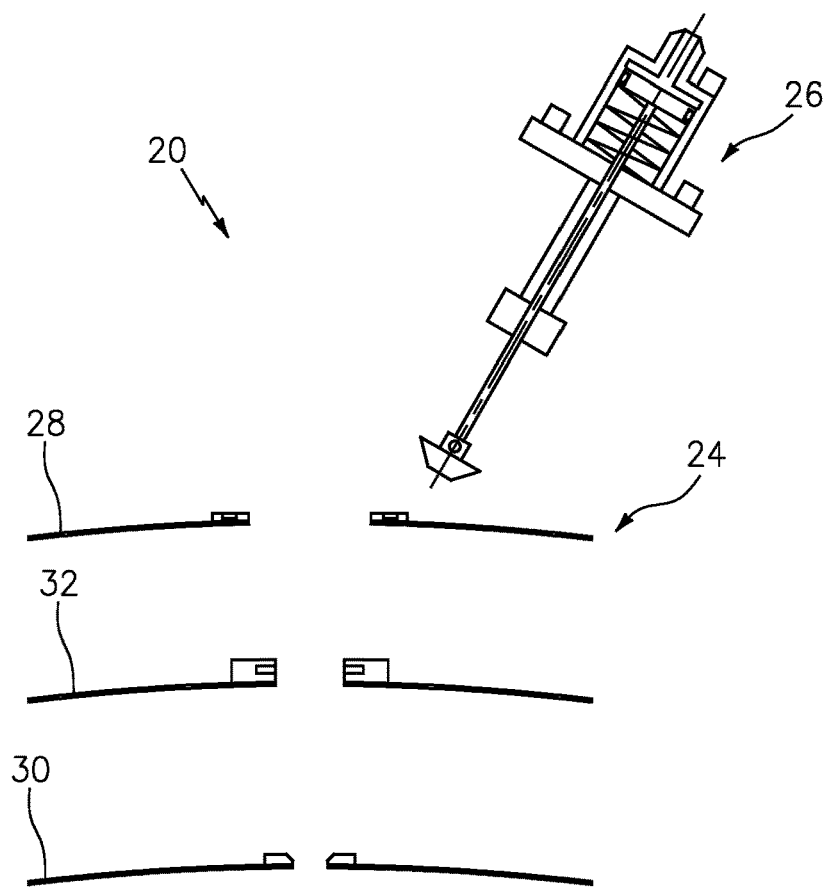

Referring to FIG. 1, a width 104 (e.g., maximum diameter) of the valve element 52 may be selected to be smaller than a width 106 (e.g., maximum diameter) of the inner end 96 of the linkage housing 92 at a point where the linkage housing 92 engages (e.g., contacts) the slider seal joint 100. With this arrangement, referring now to FIGS. 4 and 5, the entire valve assembly 26 may be removed from (or installed with) the turbine engine structure 24 without requiring access to an interior of the turbine engine structure 24; e.g., an interior of any of the components 28, 30 and/or 32.

Figure 6:
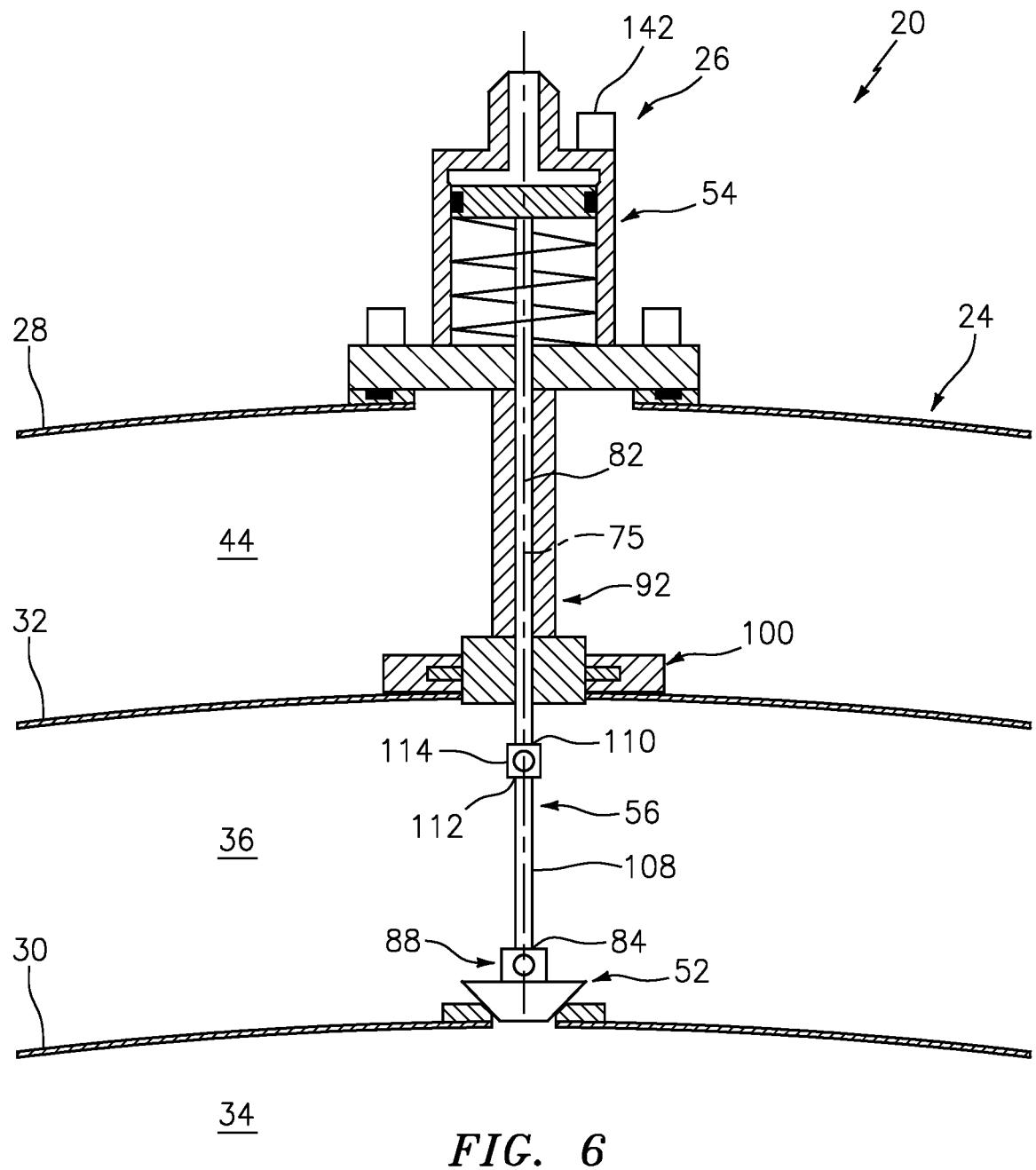
FIG. 6 is a cross-sectional sectional illustration of a portion of another turbine engine assembly with its valve element in a closed position.
Figure 7:
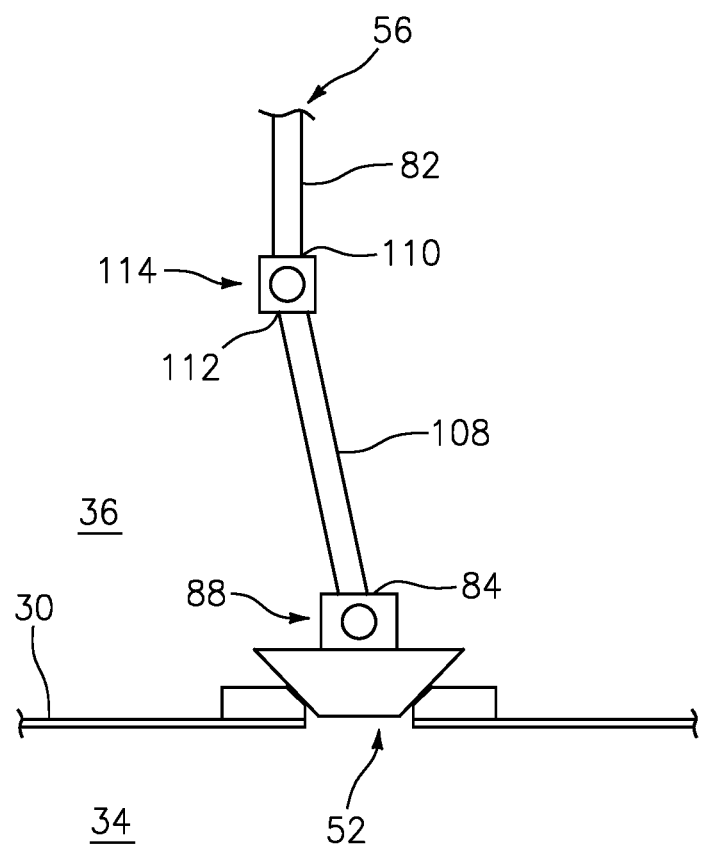
FIG. 7 is an enlarged view of a portion of the turbine engine assembly shown in FIG. 6.

In some embodiments, referring to FIG. 6, the valve linkage 56 may further include a second rod 108. For example, the first rod 82 may project into the second flow path 36 to its inner end 110. The inner end 110 of the first rod 82 is connected to an outer end 112 of the second rod 108 via a second pivot 114 joint such as, but not limited to, a ball joint; e.g., a spherical joint. An inner end of the second rod 108 is connected to the valve element 52 via the first pivot joint 88. With such an arrangement, the valve linkage 56 can further accommodate shifting (e.g., see FIG. 7) of the inner duct wall 30 relative to the other components (e.g., 28 and/or 32).

Figure 8:
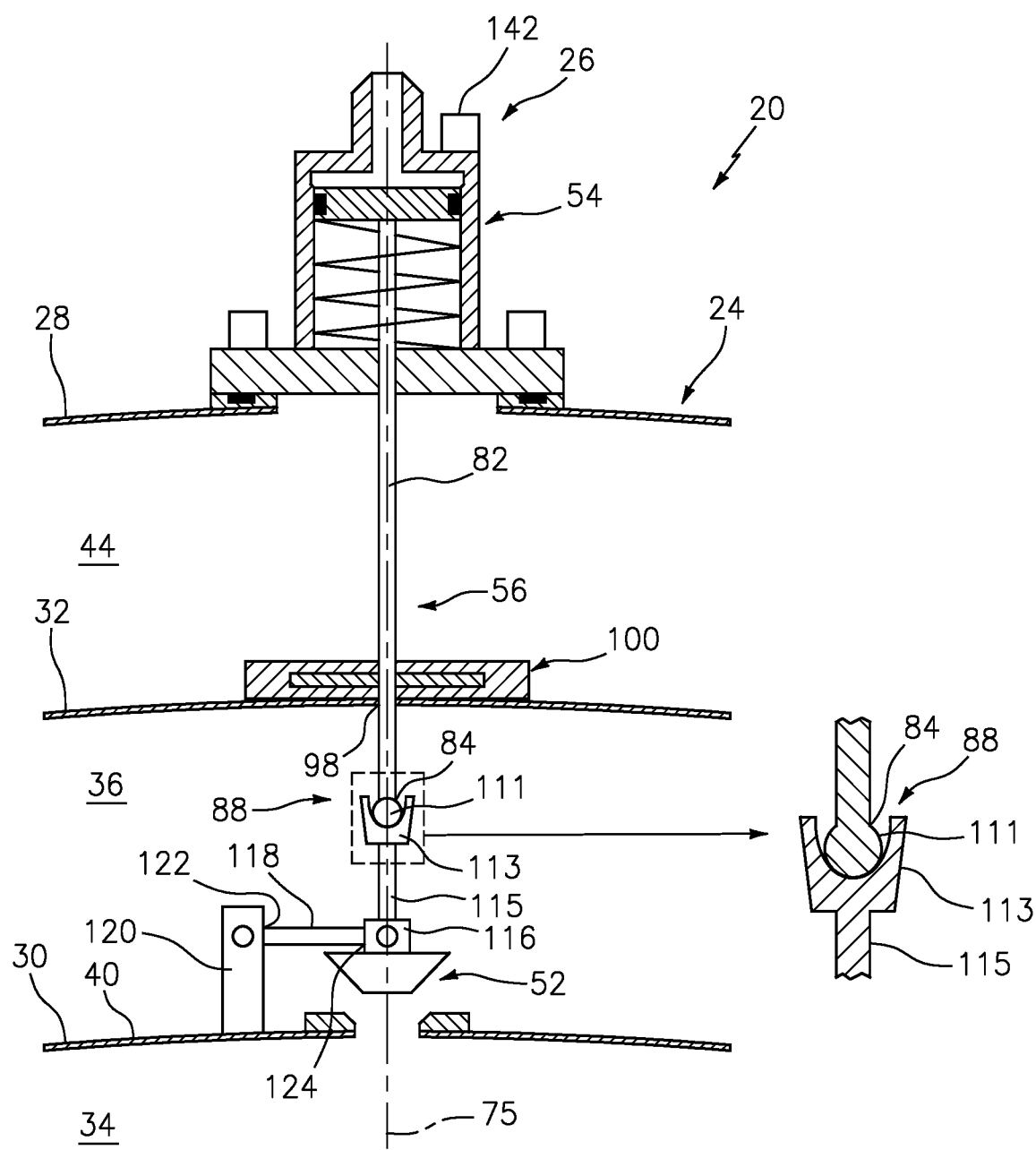
FIG. 8 is a cross-sectional sectional illustration of a portion of another turbine engine assembly with its valve element in an open position, as well as an enlarged view of a joint of the turbine engine assembly.
Figure 9:
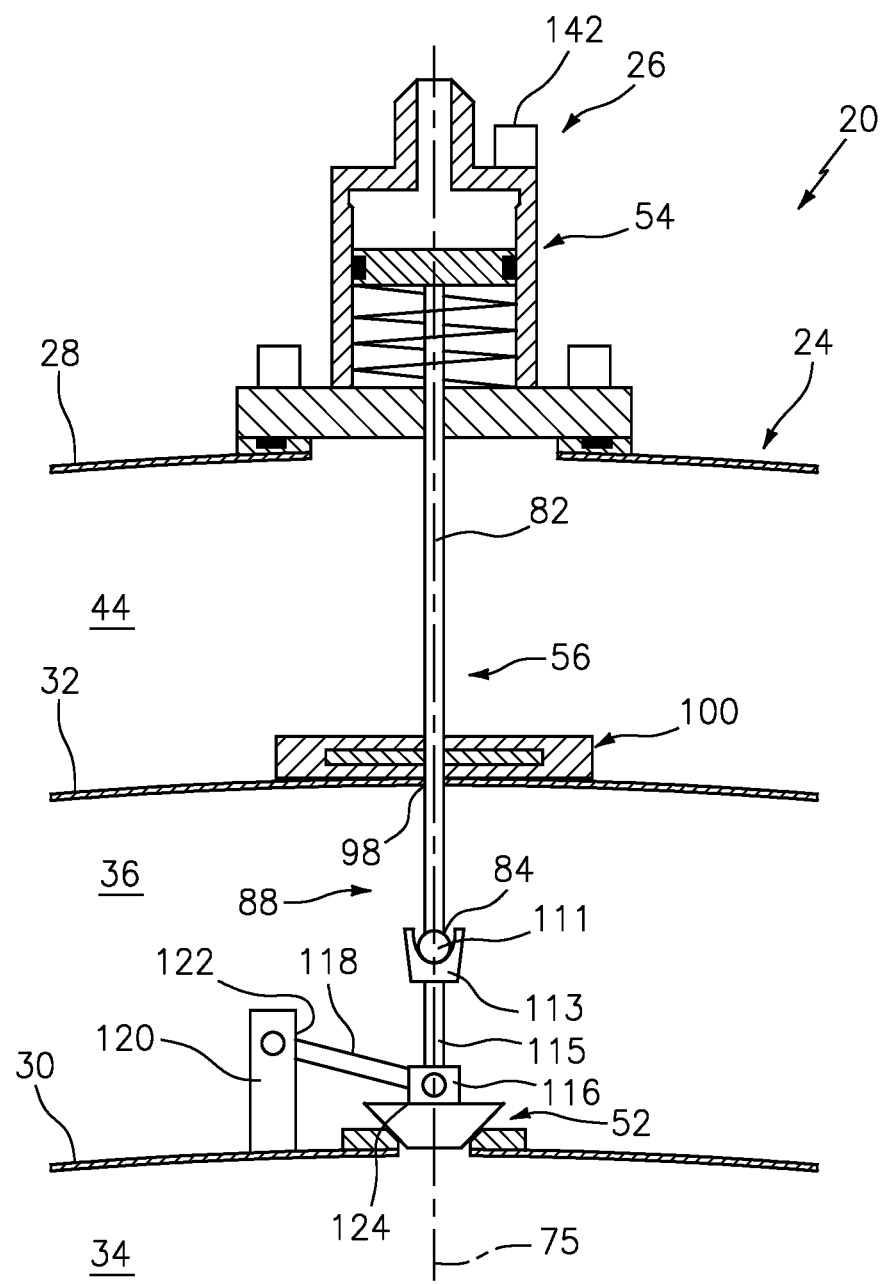
FIG. 9 is a cross-sectional sectional illustration of a portion of the turbine engine assembly of FIG. 8 with its valve element in a closed position.
Figure 10:
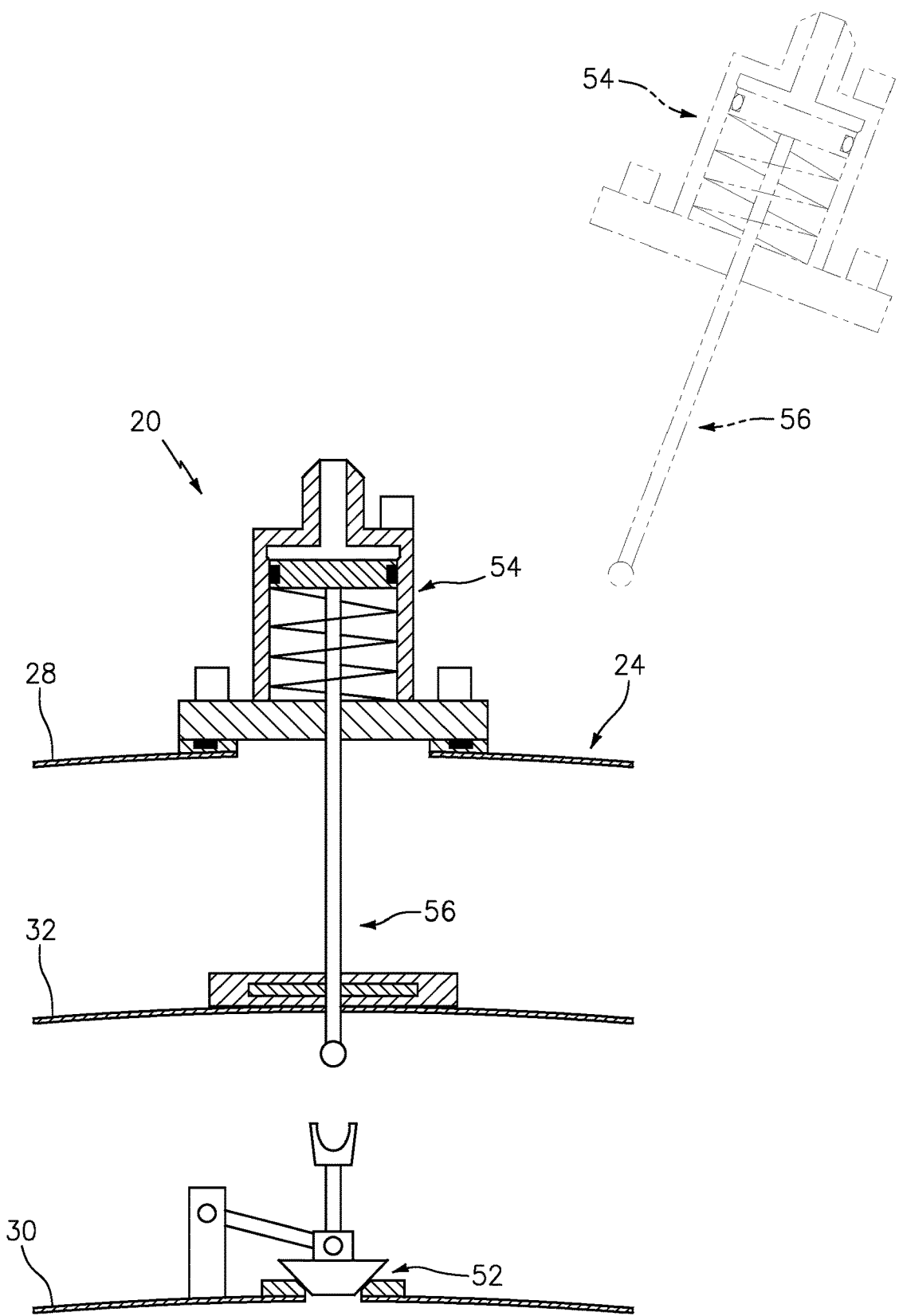
FIG. 10 illustrates a sequence of steps during removal of a valve assembly from a turbine engine structure of the turbine engine assembly of FIG. 8.

In some embodiments, referring to FIGS. 8 and 9, the valve assembly 26 may be configured such that the valve actuator 54 is severable/detachable from the valve element 52. With such an arrangement, as shown in FIG. 10, the valve actuator 54 and the valve linkage 56 may be removed from (or installed with) the turbine engine structure 24 independent of the valve element 52 and, for example, without requiring access to an interior of the turbine engine structure 24.

The pivot joint 88 of FIGS. 8 and 9 may be configured as a (e.g., open) socket joint; e.g., an open ball and socket/pocket joint. This pivot joint 88 includes a bearing element 111 (e.g., a ball) and a socket element 113. The bearing element 111 may be attached to or integrated with the valve linkage 56 at the inner linkage end 84. The socket element 113 may be attached to the valve element 52, for example, through a first valve element linkage 115 attached to the valve element 52 by a second pivot joint 116.

The valve element 52 of FIGS. 8 and 9 is mounted/mechanically coupled to the inner duct wall 30 by a second valve element linkage 118 and a mount 120. A first end 122 of the second valve element linkage 118 is pivotally coupled to the mount 120. A second end 124 of the second valve element linkage 118 is pivotally coupled to the valve element 52; e.g., at the second pivot joint 116. The mount 120 is fixedly attached to the inner duct wall 30 at, for example, its outer surface 40.

In some embodiments, for example referring to FIGS. 8 and 9, the valve assembly 26 may be configured without the linkage housing 92 (see FIGS. 1 and 2). The intermediate portion 90 of the valve linkage 56 may thereby be exposed within the void 44. The valve linkage 56 may also project through the aperture 98 in the intermediate structure 32 as well as sealingly engage the intermediate structure 32 through the slider seal joint 100.

Figure 11:
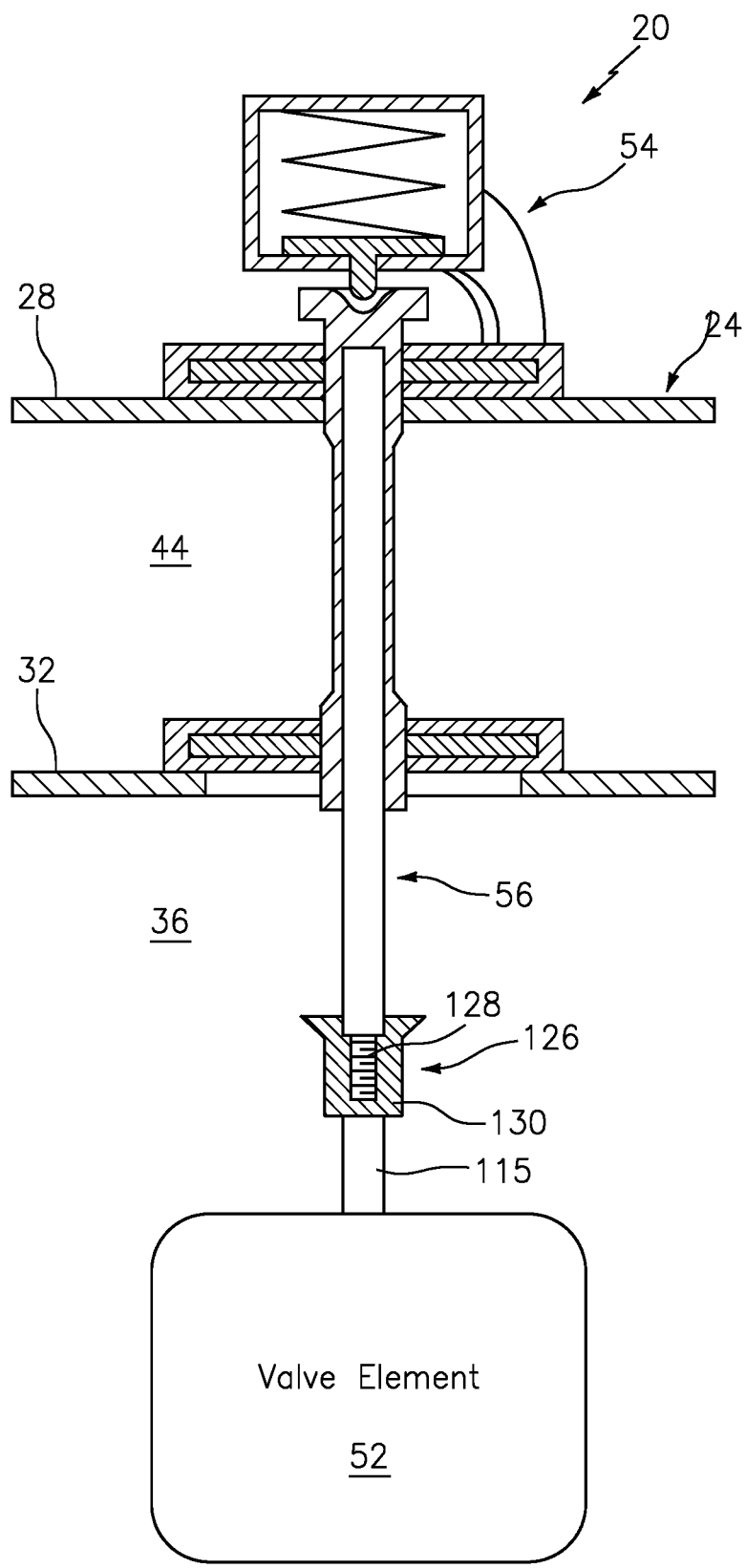
FIG. 11 is a cross-sectional sectional illustration of a portion of another turbine engine assembly.

FIG. 11 illustrates another embodiment of a severable joint 126 between the valve linkage 56 and the first valve element linkage 115. In this embodiment, the severable joint 126 is a threaded joint. A threaded end 128 of the valve linkage 56, for example, may be threaded into a tapped bore 130 in the first valve element linkage 115.

Figure 12:
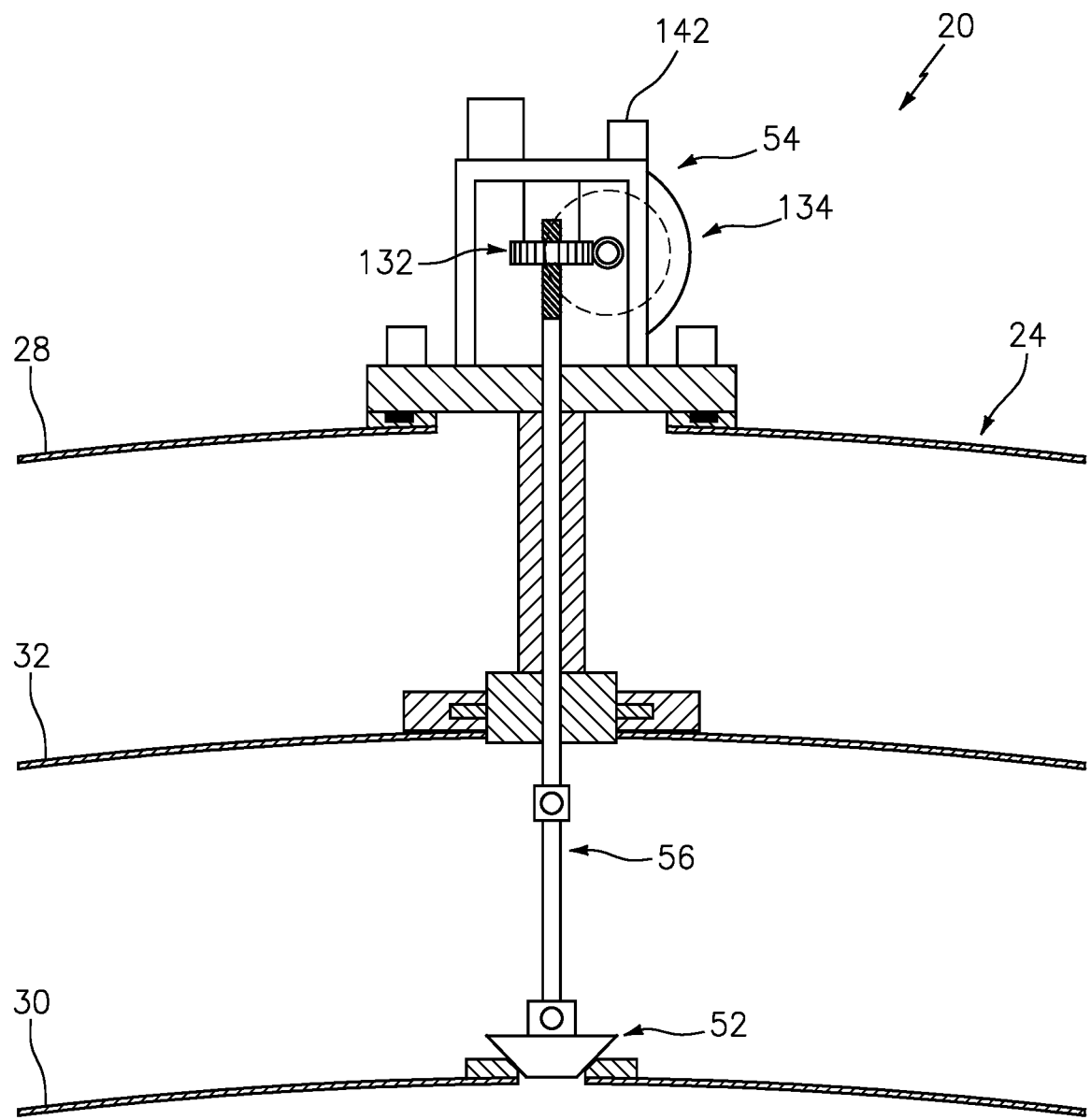
FIG. 12 is a cross-sectional sectional illustration of a portion of another turbine engine assembly with an electric actuator.

In some embodiments, referring to FIG. 12, the valve actuator 54 may be configured as an electric actuator. The piston 62 described above, for example, may be replaced with a screw jack gear arrangement 132 which mechanically couples the valve linkage 56 with an electric motor 134.

Figure 13:
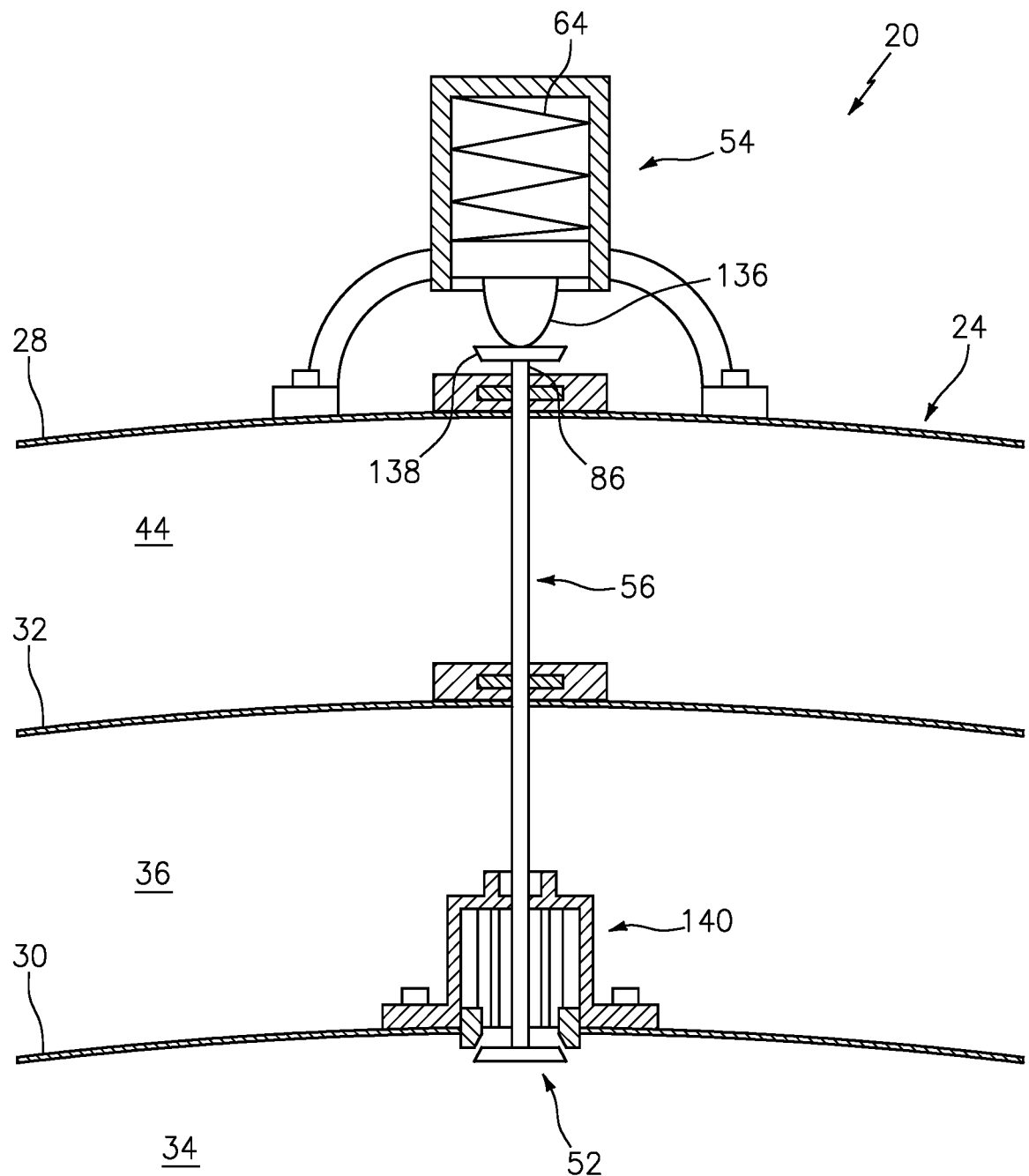
FIG. 13 is a cross-sectional sectional illustration of a portion of another turbine engine assembly with its valve element in an open position.
Figure 14:
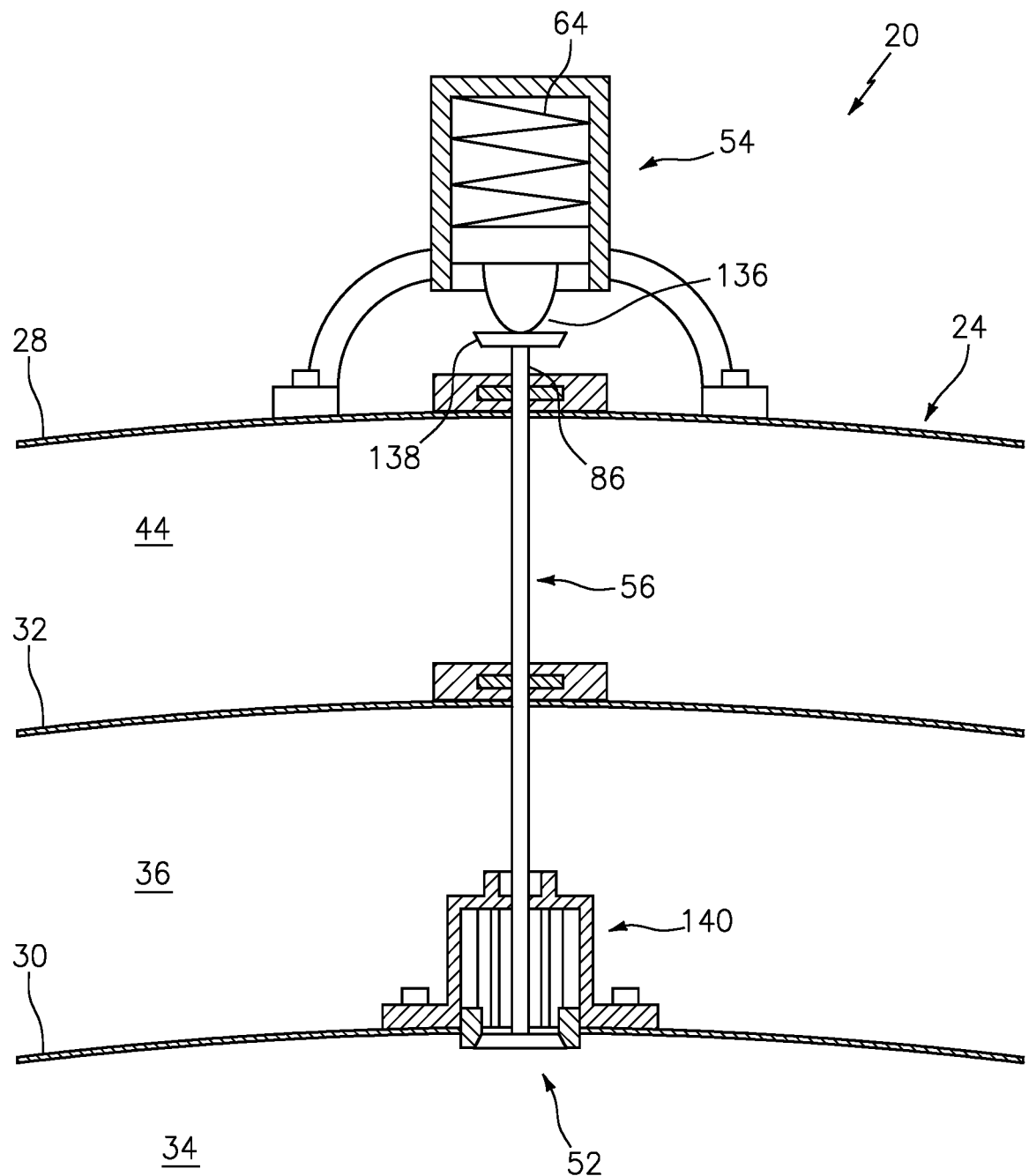
FIG. 14 is a cross-sectional sectional illustration of a portion of the turbine engine assembly of FIG. 13 with its valve element in a closed position.

In some embodiments, referring to FIGS. 13 and 14, the valve actuator 54 may be severable/detachable from the valve linkage 56. In such an embodiment, an actuation element 136 of the valve actuator 54 may be configured as a bearing element that engages (e.g., contacts and pushes against) a land 138 attached to the valve linkage 56 at the outer linkage end 86.

In the specific embodiment of FIGS. 13 and 14, the spring element 64 is configured to push the valve element 52 radially inwards towards or to its open position of FIG. 13 when a force of the spring element 64 is greater than a fluid pressure force within the first flow path 34. By contrast, when the fluid pressure force within the first flow path 34 is greater than the spring element force, the valve element 52 moves radially outward towards or into its closed position of FIG. 14.

In some embodiments, the valve linkage 56 may be slidably connected to the inner duct wall 30 by a cage 140. This cage 140 may support the valve linkage 56 relative to the inner duct wall 30

In some embodiments, the valve element 52 may be located radially within the inner duct wall 30 when the valve element 52 is in its open position (see FIG. 13). In other embodiments, referring to FIGS. 1, 3, 8 and 15, the valve element 52 may be located radially outward of the inner duct wall 30.

Figure 15:
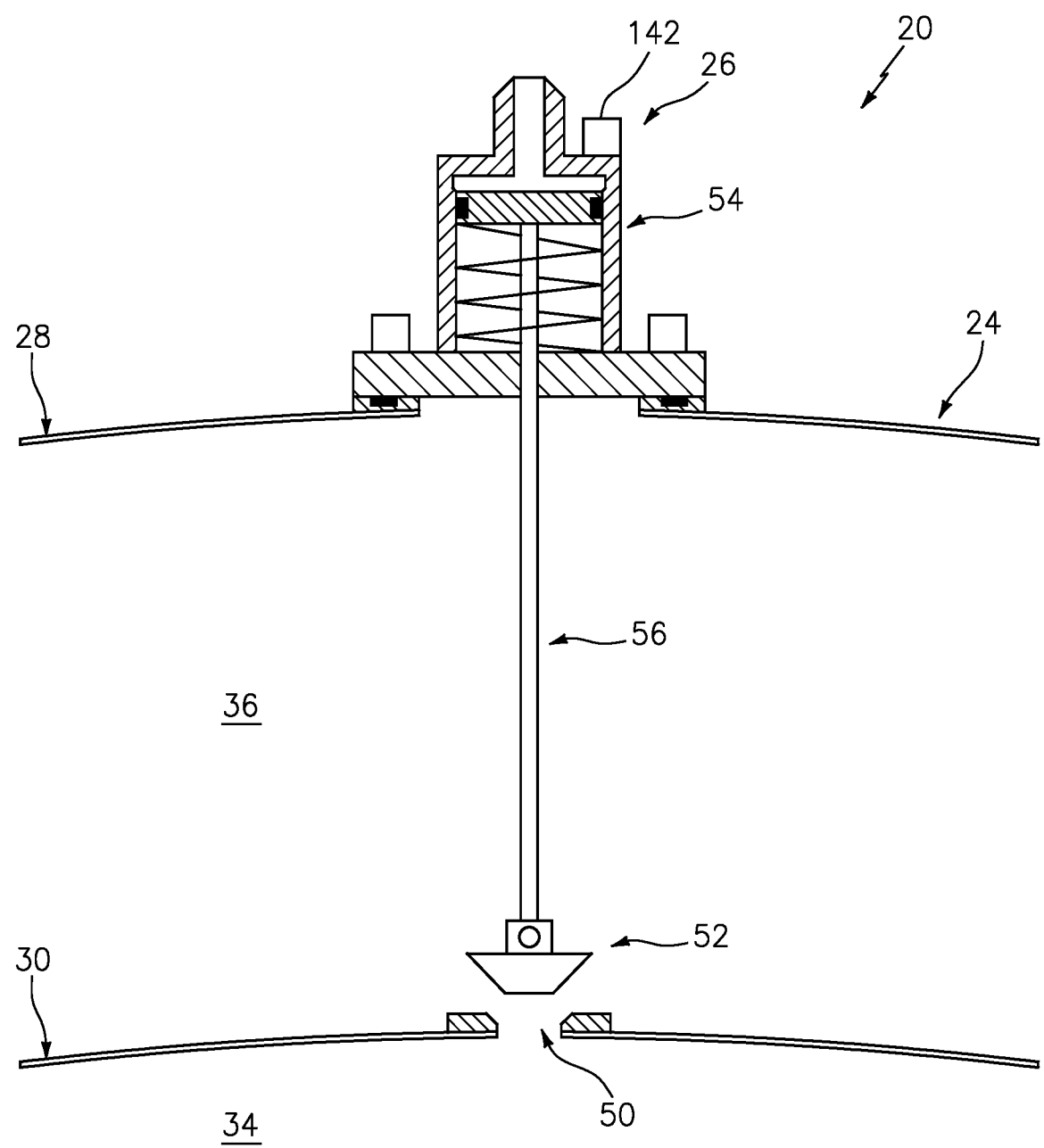
FIG. 15 is a cross-sectional sectional illustration of a portion of still another turbine engine assembly.

In some embodiments, for example referring to FIG. 15, the valve actuator 54 may be configured with a sensor 142. This sensor 142 may be configured to determine when the valve element 52 is in its open position or its closed position. Examples of the sensor 142 include, but are not limited to, a linear variable differential transformer (LVDT) sensor, a position switch sensor and a capacitance sensor.

Referring to FIG. 15, the present disclosure contemplates any one of the afore-described assemblies 20 being configured without the intermediate structure 32. The present disclosure also contemplates any one of the afore-described assemblies 20 being configured with more than one intermediate structure; e.g., two, three or more intermediate structures; e.g., walls, casings, compartment walls, etc.

Figure 16:
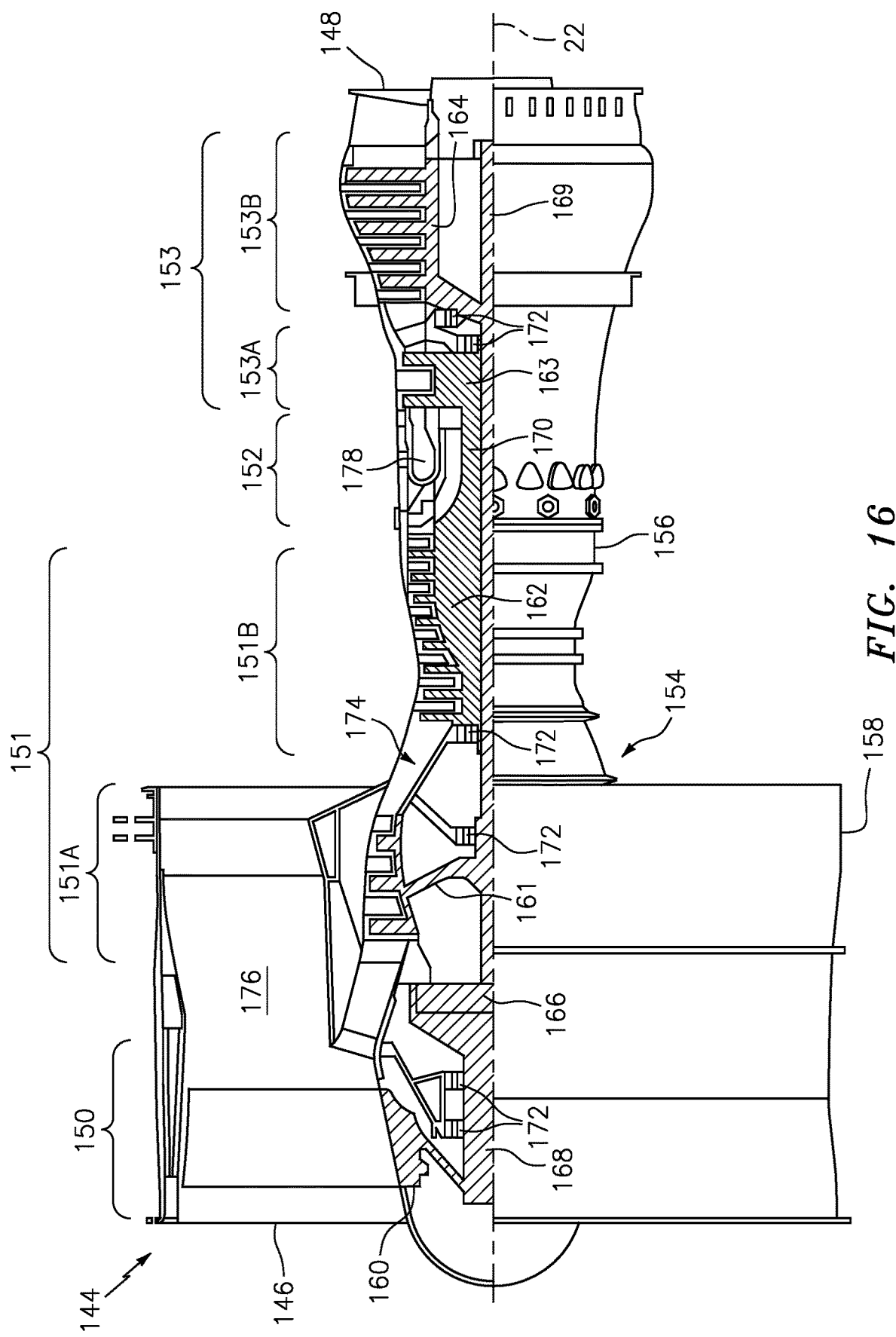
FIG. 16 is a side cutaway illustration of a gas turbine engine.

FIG. 16 is a side cutaway illustration of a geared turbine engine 144 with which the turbine engine assembly 20 may be included. This turbine engine 144 extends along the axial centerline 22 between an upstream airflow inlet 146 and a downstream airflow exhaust 148. The turbine engine 144 includes a fan section 150, a compressor section 151, a combustor section 152 and a turbine section 153. The compressor section 151 includes a low pressure compressor (LPC) section 151A and a high pressure compressor (HPC) section 151B. The turbine section 153 includes a high pressure turbine (HPT) section 153A and a low pressure turbine (LPT) section 153B.

The engine sections 150-153B are arranged sequentially along the centerline 22 within an engine housing 154. This housing 154 includes an inner case 156 (e.g., a core case) and an outer case 158 (e.g., a fan case). The inner case 156 may house one or more of the engine sections 151A-153B; e.g., an engine core. The outer case 158 may house at least the fan section 150.

Each of the engine sections 150, 151A, 151B, 153A and 153B includes a respective rotor 160-164. Each of these rotors 160-164 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 160 is connected to a gear train 166, for example, through a fan shaft 168. The gear train 166 and the LPC rotor 161 are connected to and driven by the LPT rotor 164 through a low speed shaft 169. The HPC rotor 162 is connected to and driven by the HPT rotor 163 through a high speed shaft 170. The shafts 168-170 are rotatably supported by a plurality of bearings 172; e.g., rolling element and/or thrust bearings. Each of these bearings 172 is connected to the engine housing 154 by at least one stationary structure such as, for example, an annular support strut.

During operation, air enters the turbine engine 144 through the airflow inlet 146. This air is directed through the fan section 150 and into a core gas path 174 (e.g., flow path 34 of FIG. 15) and a bypass gas path 176 (e.g., flow path 36 of FIG. 15). The core gas path 174 extends sequentially through the engine sections 151A-153B. The air within the core gas path 174 may be referred to as "core air". The bypass gas path 176 extends through a bypass duct, which bypasses the engine core. The air within the bypass gas path 176 may be referred to as "bypass air".

The core air is compressed by the compressor rotors 161 and 162 and directed into a combustion chamber 178 of a combustor in the combustor section 152. Fuel is injected into the combustion chamber 178 and mixed with the compressed core air to provide a fuel-air mixture. This fuel air mixture is ignited and combustion products thereof flow through and sequentially cause the turbine rotors 163 and 164 to rotate. The rotation of the turbine rotors 163 and 164 respectively drive rotation of the compressor rotors 162 and 161 and, thus, compression of the air received from a core airflow inlet. The rotation of the turbine rotor 164 also drives rotation of the fan rotor 160, which propels bypass air through and out of the bypass gas path 176. The propulsion of the bypass air may account for a majority of thrust generated by the turbine engine 144, e.g., more than seventy-five percent (75%) of engine thrust. The turbine engine 144 of the present disclosure, however, is not limited to the foregoing exemplary thrust ratio.

The turbine engine assembly 20 may be included in various turbine engines other than the one described above. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train. The turbine engine assembly 20 may be included in a geared or non-geared turbine engine configured with a single spool, with two spools (e.g., see FIG. 16), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine with an axial centerline, comprising:
  a turbine engine structure including an outer duct wall, an inner duct wall, a first flow path and a second flow path, the inner duct wall radially inward of the outer duct wall, the first flow path radially inward of the inner duct wall, and the second flow path radially outward of the inner duct wall and radially inward of the outer duct wall; and
  a valve assembly including a valve element, a valve actuator and a rod, the valve element configured to regulate flow of fluid between the first flow path and the second flow path, the valve actuator configured to move the valve element, the valve actuator positioned entirely radially outward of the outer duct wall, the rod extending within the second flow path and mechanically coupling the valve actuator to the valve element, and the rod connected to the valve element through a pivot joint.

2. The assembly of claim 1, wherein the valve actuator comprises a piston.

3. The assembly of claim 2, wherein the valve actuator further comprises a spring element engaging the piston.

4. The assembly of claim 1, wherein the valve actuator comprises a spring element.

5. The assembly of claim 1, wherein the valve actuator comprises an electric motor.

6. The assembly of claim 1, wherein
  the valve actuator is configured to translate the valve element between an open position and a closed position;
  the first flow path is fluidly coupled with the second flow path through a passage in the inner duct wall; and
  the valve element is configured to open the passage when the valve element is in the open position, and the valve element is configured to close the passage when the valve element is in the closed position.

7. The assembly of claim 6, wherein the valve element is radially outward of the inner duct wall when the valve element is in the open position.

8. The assembly of claim 6, wherein the valve element is radially inward of the inner duct wall when the valve element is in the open position.

9. The assembly of claim 1, wherein
  the valve element comprises a valve plunger; and
  the valve actuator is configured to translate the valve plunger along a longitudinal axis of the valve assembly between an open position and a closed position.

10. The assembly of claim 1, wherein
  the valve assembly further includes a second rod that extends within the second flow path and mechanically couples the rod to the valve element; and
  the rod is connected to the second rod through a second pivot joint.

11. The assembly of claim 1, wherein the pivot joint comprises a ball joint.

12. The assembly of claim 1, wherein the pivot joint comprises a socket joint.

13. The assembly of claim 1, wherein the valve assembly is configured for complete removal from the turbine engine structure without access to an interior of the outer duct wall.

14. The assembly of claim 1, wherein
  the valve element is mechanically coupled to the inner duct wall; and
  the valve actuator is severable from the valve element and configured for complete removal from the turbine engine structure without access to an interior of the outer duct wall.

15. The assembly of claim 1, wherein
  the turbine engine structure further includes an intermediate structure radially between the inner duct wall and the outer duct wall; and the second flow path is radially inward of the intermediate structure.

16. The assembly of claim 2, wherein the rod is fixedly attached to the piston.

17. The assembly of claim 1, wherein
an inner surface of the inner duct wall at least partially forms the first flow path; and
an outer surface of the inner duct wall at least partially forms the second flow path.

18. An assembly for a turbine engine with an axial centerline, comprising:
a turbine engine structure including an outer duct wall, an inner duct wall, a first flow path and a second flow path, the inner duct wall radially inward of the outer duct wall, the first flow path radially inward of the inner duct wall, and the second flow path radially outward of the inner duct wall and radially inward of the outer duct wall; and
a valve assembly including a valve element, a valve actuator and a rod, the valve element configured to regulate flow of fluid between the first flow path and the second flow path, the valve actuator configured to move the valve element, the valve actuator positioned entirely radially outward of the outer duct wall, the rod extending within the second flow path and mechanically coupling the valve actuator to the valve element, and the rod connected to the valve element through a threaded joint.

19. An assembly for a turbine engine with an axial centerline, comprising:
a turbine engine structure including an outer duct wall, an inner duct wall, a first flow path and a second flow path, the inner duct wall radially inward of the outer duct wall, the first flow path radially inward of the inner duct wall, and the second flow path radially outward of the inner duct wall and radially inward of the outer duct wall; and
a valve assembly including a valve element and a valve actuator, the valve element mechanically coupled to the inner duct wall and configured to regulate flow of fluid between the first flow path and the second flow path, and the valve actuator configured to move the valve element, wherein the valve actuator is severable from the valve element and disposed outside of the turbine engine structure.

* * * * *